March 13, 1951 W. A. WILLIAMS 2,545,327
ADJUSTABLE DIAMETER PULLEY
Filed May 9, 1947 4 Sheets-Sheet 1
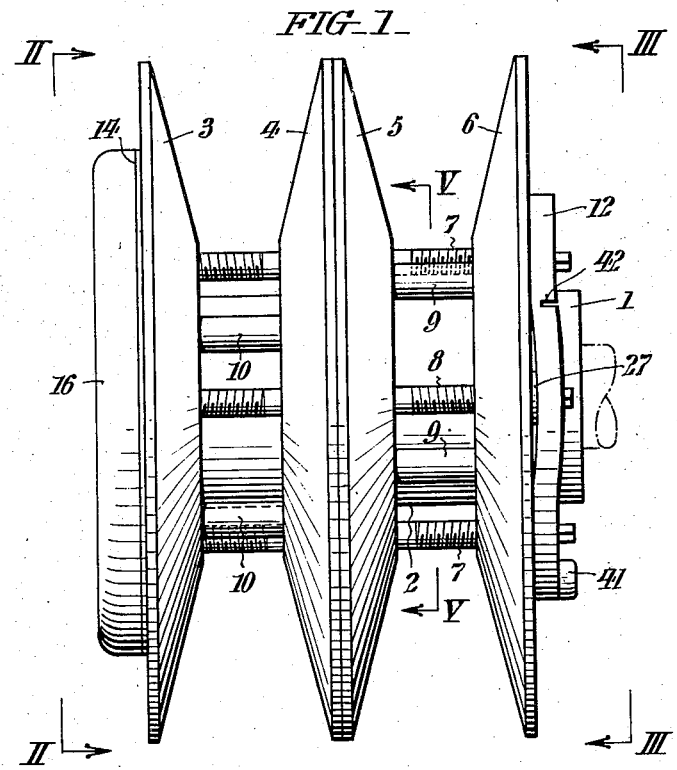
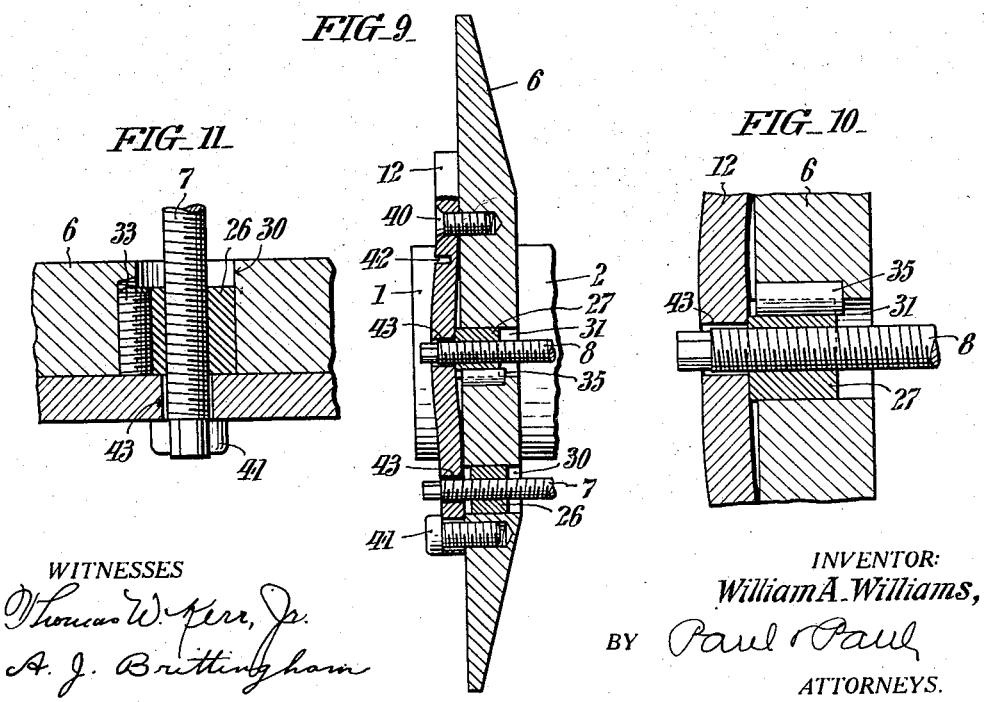
WITNESSES
Thomas W. Kerr, Jr.
A. J. Brittingham
INVENTOR:
William A. Williams,
BY Paul & Paul
ATTORNEYS.

March 13, 1951 W. A. WILLIAMS 2,545,327
ADJUSTABLE DIAMETER PULLEY
Filed May 9, 1947 4 Sheets-Sheet 2
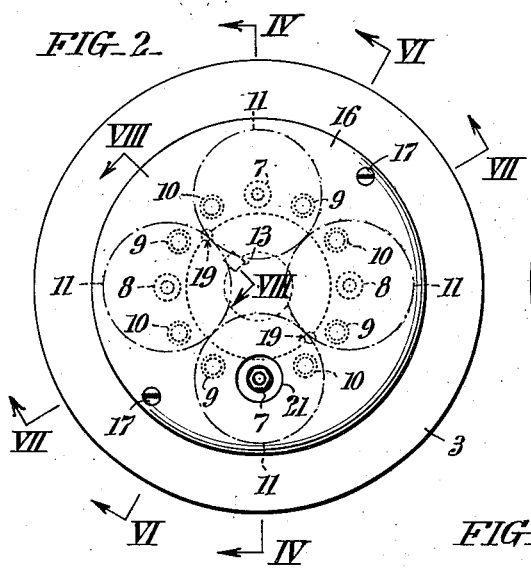
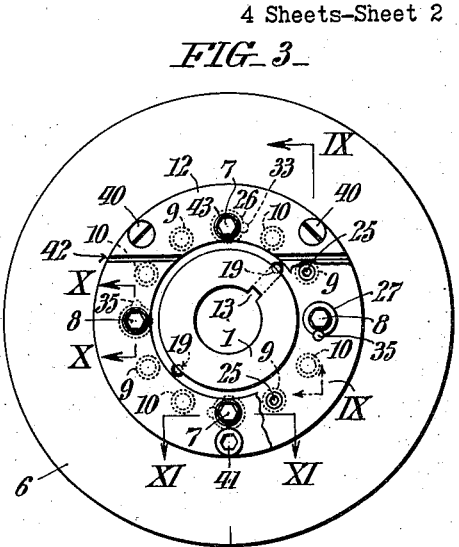
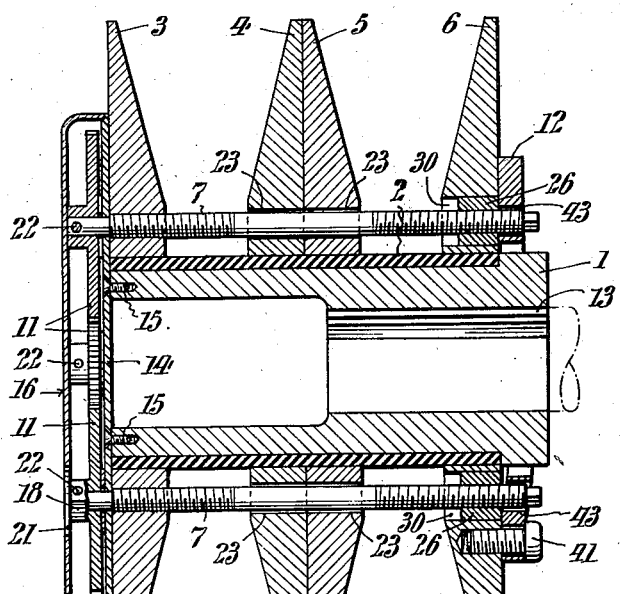
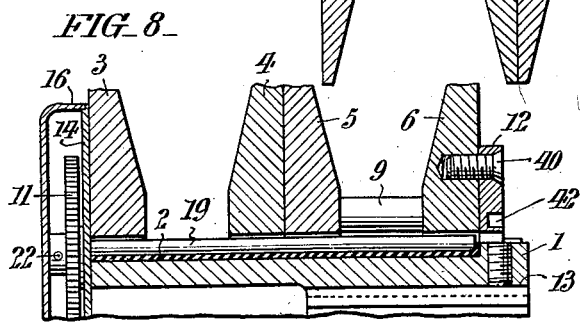
INVENTOR:
William A. Williams,
BY Paul & Paul
ATTORNEYS.

March 13, 1951 W. A. WILLIAMS 2,545,327
ADJUSTABLE DIAMETER PULLEY
Filed May 9, 1947 4 Sheets-Sheet 3
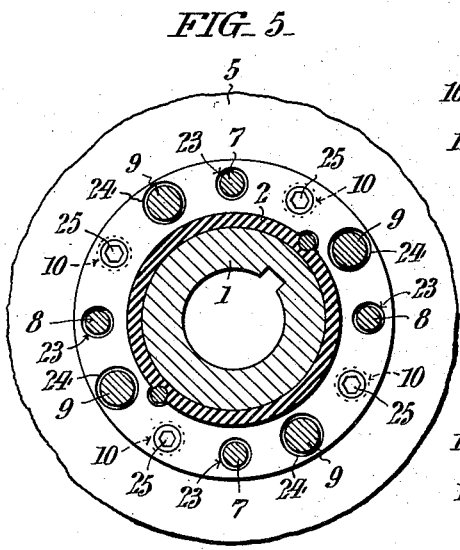
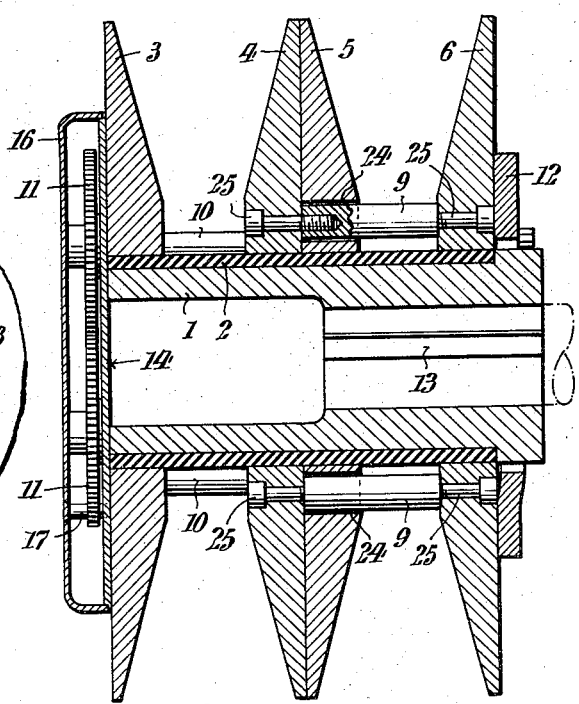
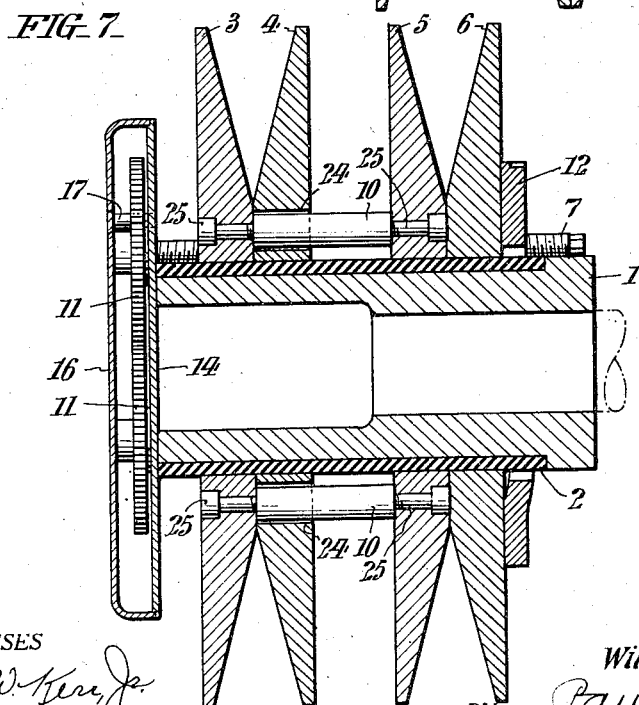
WITNESSES
Thomas W. Kerr, Jr.
A. J. Brittingham
INVENTOR:
William A. Williams,
BY Paul & Paul
ATTORNEYS.

March 13, 1951 W. A. WILLIAMS 2,545,327
ADJUSTABLE DIAMETER PULLEY
Filed May 9, 1947 4 Sheets-Sheet 4
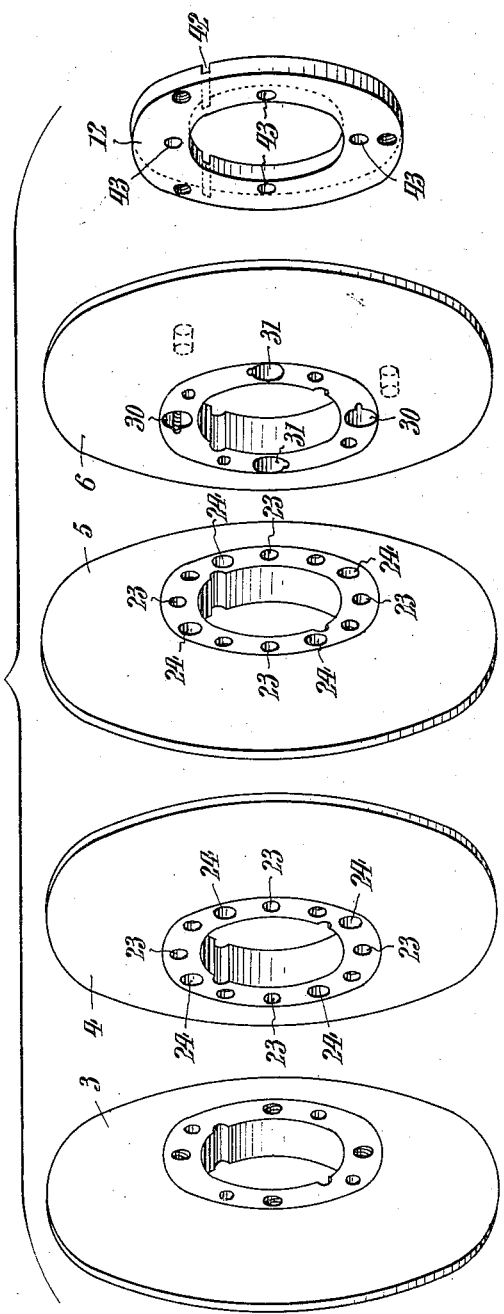
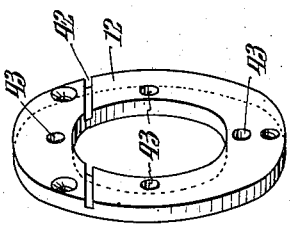
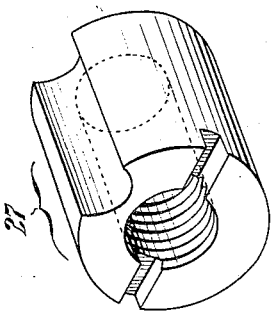
WITNESSES
Thomas W. Kerr, Jr.
A. J. Brittingham
INVENTOR:
William A. Williams,
BY Paul & Paul
ATTORNEYS.

Patented Mar. 13, 1951

2,545,327

UNITED STATES PATENT OFFICE 2,545,327

ADJUSTABLE DIAMETER PULLEY

William A. Williams, Philadelphia, Pa., assignor to The American Pulley Company, Philadelphia, Pa., a corporation of Pennsylvania Application May 9, 1947, Serial No. 747,056

11 Claims. (Cl. 74—230.17)

This invention relates generally to adjustable diameter pulleys for varying the speed ratio of a driven shaft relative to the speed of the driving shaft. In its preferred form my invention employs a belt of trapezoidal cross-section such as is well known to the art as the V-belt which is usually of rubber and fabric construction.

The general object of my invention is to provide a structurally simple and rugged adjustable diameter pulley which will not wear out rapidly or get out of order and is easy to construct and assemble. Another object of my invention relates to a provision of a simple and novel mechanism for adjusting the effective diameter of the pulley easily and quickly. Another object of my invention is the provision of an adjustable diameter pulley having expandable and contractable flanges which will not become frozen or immovable laterally under operating conditions as frequently happens where there is metal to metal contact between a hub and movable flanges thereon. Another object of my invention is the provision of an adjustable diameter pulley which may be positively and easily locked in its selected adjustment positions until further adjusted.

Still further objects and advantages of my invention will become apparent from the following description of a preferred and a modified form which are illustratively shown in the accompanying drawings.

Of the drawings,

Fig. 1 is a front elevational view of my invention.

Fig. 2 is an end view taken as indicated by the arrows II—II in Fig. 1.

Fig. 3 is an end view taken as indicated by the arrows III—III in Fig. 1.

Fig. 4 is a vertical sectional view taken as indicated by the arrows IV—IV in Fig. 2.

Fig. 5 is a partial transverse section taken as indicated by the arrows V—V in Fig. 1.

Fig. 6 is a longitudinal section taken as indicated by the arrows VI—VI in Fig. 2.

Fig. 7 is a longitudinal section taken as indicated by the arrows VII——VII in Fig. 2, but showing the flanges in extreme contracted position.

Fig. 8 is a partial longitudinal section taken as indicated by the arrows VIII—VIII in Fig. 2.

Fig. 9 is a sectional view taken as indicated by the arrows IX—IX in Fig. 3.

Fig. 10 is a partial sectional view taken as indicated by the arrows X—X in Fig. 3.

Fig. 11 is a partial section taken as indicated by the arrows XI—XI in Fig. 3.

Fig. 12 is an exploded perspective view showing the relation of the flanges and locking pressure ring.

Fig. 13 is a perspective view of the locking pressure ring.

Fig. 14 is a perspective view of one of the cylindrical elements involved in the locking mechanism and which is operatively engaged by the locking pressure ring 13.

In describing the embodiments of this invention shown in the drawings, a specific terminology will be adopted for the purpose of clarity, but it is to be understood that it is not intended thereby to limit the invention to this detailed description of illustrative embodiments thereof. Each term adopted is intended to include all equivalents thereof which operate in a substantially similar manner to accomplish a substantially similar result.

In its preferred form, my invention comprises generally a hub 1, a sleeve 2 mounted on the hub 1, a plurality of flanges 3, 4, 5 and 6 mounted to slide laterally on the sleeve 2 (keys 19 preventing rotation around the hub, Fig. 8) a plurality of operating rods 7 and 8 (oppositely threaded from each other) operatively connected to the outer flanges 3 and 6, a plurality of connecting rods 9 and 10 connecting the outer flanges 3 and 6 integrally to the inner flanges 4 and 5, meshing gears 11 mounted on the ends of the operating rods 7 and 8, and a locking pressure ring 12 mounted on the flange 6. The manner of threadedly mounting the flanges 3 and 6 on the operating rods 7 and 8 is different but this difference is more appropriately taken up later in its detail.

The hub 1 is of a conventional type having a key-way 13 for mounting on a shaft indicated in dotted lines in the drawings. The sleeve 2 which is conveniently made of rubber is bonded to the outer surface of the hub 1 in a manner well understood in the art. Of course, either natural or synthetic rubber could be used and also other materials of similar characteristics. The function of this sleeve 2 is to insure easy sliding movement of the flanges 3, 4, 5 and 6 and to avoid any tendency to freeze in place. The hub 1 is recessed to receive the sleeve 2 so that the outer surface of the sleeve 2 is uniform and continuous with the remainder of the outer surface of the hub 1. See Fig. 4. A circular end plate 14 is mounted on the end of the hub 1 by means of screws 15. The edge of the end plate 14 is peripherally recessed to receive a metal cover member 16 which is held in place by screws 17. This cover member 16 houses the meshing gears 11 and has an opening 21 formed therein for access to one of the gears 11 which is formed at 18 to receive a wrench for adjustment as will be explained in more detail later.

The four operating rods 7 and 8 are integrally connected to the gears 11 by means of pins 22 and extend through holes provided in the end plate 14. The outer flanges 3 and 6 are in threaded engagement with the operating rods 7 and 8 but the inner flanges 4 and 5 have holes 23 formed therein to allow the rods 7 and 8 to pass therethrough with ample working clearance. See Fig. 4. Inner flange 5 is rigidly connected to outer flange 3 by means of four connecting rods 10, holes 24 being provided in the flange 4 to permit the rods 10 to extend therethrough with ample working clearance. These connecting rods 10 are connected to the flanges 3 and 5 by means of screws 25 as shown in Figs. 5 and 7. The flanges 4 and 6 are similarly connected by the connecting rods 9. Thus as flange 3 moves laterally under the control of the operating rods 7 and 8, it carries with it the flange 5 to which it is integrally connected by connecting rods 10. The flanges 4 and 6 operate as a unit in the same manner.

The threading of the rods 7 and 8 is important. It is obvious that the portions of threading on each end of the rods 7 and 8 must be opposite so that flanges 3 and 6 will always move in the opposite direction as the operating rods 7 and 8 are rotated. Further, each of the operating rods 7 and 8 must be oppositely threaded in relation to those whose gears 11 mesh with its gear 11, because the meshing gears 11 turn in opposite directions. Hence the operating rods 7 will be oppositely threaded from the operating rods 8 and the threading on the two ends of all of the operating rods 7 and 8 will be opposite.

The flange 6 is connected to the operating rods 7 and 8 by means of cylindrical element 26 and locking element 27 mounted in round holes 30 and 31 formed in the flange 6. The elements 26 and 27 are both interiorly threaded for threaded connection with the rods 7 and 8 respectively. The element 26 is formed with a semi-circular threaded key-way in its outer surface to cooperate with a similar threaded key-way in the holes 30 to receive the locking screw 33 as shown in Fig. 11. Thus the element 26 is integrally connected to the flange 6 with capacity for easy assembly and adjustment.

The locking element 27 (Fig. 14) is similarly mounted in the hole 31 (Fig. 10) except that the cylindrical key 35 corresponding to locking screw 33 is smooth which permits free axial movement of the element 27 with reference to the flange 6. The key-way formed in the element 27 to receive the cylindrical key 35 is also unthreaded and smooth. The purpose of this assembly is to permit pressure transmitted from the locking ring 12 to be transmitted directly through the elements 27 to the rods 8 in an axial direction. This frictional engagement under pressure between the threads of the rods 8 and the threads of the elements 27 effectively locks the rods 8 until the pressure from the locking pressure ring 12 is released.

It should be pointed out here that this locking arrangement is not limited in its operative effects to the threaded engagement between the rods 8 and the elements 27. The pressure from the locking ring 12 is transmitted axially to the two rods 8 and also to the two rods 7. Thus there is a simultaneous tightening up on all of the eight threaded engagements between the flanges 3 and 6 and the rods 7 and 8 from the operation of this locking arrangement.

This comprehensive locking effect prevents movement of the flanges during operation and also prevents wear of the threads due to the undulating nature of the forces acting on the threads during operation. The action of the belts on the flanges is such as to cause a reversal of the force during one complete revolution of the pulley and it is clear that if the threads are not kept tight and constantly pressing in one direction by an amount greater than the vibrating force, the threads would very soon pound out or wear out. It is one of the more important advantages of the present invention that the general tightening up and locking effect of this locking arrangement is in effect distributed through the multiple pulley assembly which would not be the case in the simple locking of one of the flanges or of one of the threaded engagements. In fact there would be little difficulty in preventing the change in pitch diameter of an adjustable pulley of this type by the mechanical expedient of locking merely one of the flanges or threaded engagements without obtaining the above mentioned benefits. Of course many changes could be made in the locking arrangement here shown without departing from the operative principle and thereby loosing the benefits of diffusing the tightening up effects throughout the assembly of the pulley.

The locking pressure ring 12 is mounted on the outer face of flange 6 by means of screws 40 and adjustment screw 41 which has a recessed head (known as an Allen head in the art) to receive an operating wrench. It will be noticed that a relatively deep groove 42 extends across the pressure ring 12. This groove 42 is of sufficient depth and width to provide flexibility in the pressure ring 12 so that only a negligible pressure is exerted on the locking element 27 when the adjustment screw 41 is loosened. Holes 43 are provided in the pressure ring in order that the rods 7 and 8 may project therethrough with ample working clearance. The ends of the rods 7 and 8 projecting through the pressure ring 12 are formed to receive an adjustment wrench or tool just as one of the gears 11 is so formed at 18. In this way the operating rods 7 and 8 may be rotated by a wrench or tool applied through the hole 21 in the cover member 16 or by a wrench or tool applied to any one of the ends of the rods 7 or 8 projecting through the locking ring 12. Of course the rods 7 and 8 cannot be rotated when the pressure ring 12 is exerting a locking pressure against the locking elements 27 when the screw 41 is screwed tight which insures the maintenance of adjustment during operation.

While the operation of my invention will be clear from the above detailed description of a preferred embodiment thereof, a short description of a cycle of operation will not be out of place. Suppose the pulley of my invention to be in its expanded condition as shown in Figs. 1 and 4 and it is desired to contract it to the condition shown in Fig. 7. First the adjustment screw 41 is loosened so that the pressure of the ring 12 on the elements 27 is greatly reduced whereby the rods 8 are rotatable within the elements 27. Then the appropriate wrench or tool is applied to one of the operating rods 7 or 8 in the manner described above. This operating rod 7 or 8 is then turned which causes all the operating rods 7 and 8 to turn because of the meshing of the gears 11.

The effect of this rotation is the axial movement of the flanges 4 and 6 toward the flanges 3 and 5 until they reach the position shown in Fig. 7.

While this invention has been described above in considerable detail and certain modifications thereof suggested, it will be apparent to those skilled in the art that various other changes and modifications may be made without departing from the spirit or scope of the invention as defined in the following claims.

I claim:

1. An adjustable diameter pulley comprising a hub, a resilient non-metallic sleeve mounted on said hub, a pair of outer oppositely inclined flanges slidably mounted on said sleeve, a pair of oppositely inclined inner flanges slidably mounted on said sleeve between said outer flanges, a plurality of operating rods in oppositely threaded engagement with said outer flanges, a plurality of connecting rods integrally connecting each of said outer flanges to the non-adjacent one of said inner flanges, holes being formed in the adjacent inner flange for the passage of said connecting rods therethrough, a locking element in threaded engagement with one of said operating rods, a pressure element for urging said locking element into locking frictional engagement with said operating rod, and a gear means inter-connecting said operating rods for simultaneous rotation.

2. The invention of claim 1 characterized further by the fact that said pressure element is mounted on the side of one of said flanges and has a groove formed therein to provide flexibility and an adjustable screw element for urging said pressure element into operative contact with said locking element.

3. An adjustable diameter pulley comprising a hub, a resilient non-metallic sleeve mounted on said hub, a plurality of flanges slidably mounted on said sleeve with adjacent flanges having oppositely inclined faces, a plurality of operating rods in threaded engagement with certain of said flanges, a plurality of connecting rods integrally connecting other of said flanges to the flanges in threaded engagement with the operating rods, gears mounted on said operating rods, said gears being operatively connected so that the operation of one operating rod will effect the operation of all operating rods, a locking element in threaded engagement with one of said operating rods, and a flexible pressure element in operative contact with said locking element and means for urging said pressure element against said locking element whereby the threads of said locking element are forced against the threads of said operating rod.

4. An adjustable diameter pulley comprising a hub, a resilient non-metallic sleeve mounted on said hub, a pair of oppositely inclined flanges slidably mounted on said sleeve, a plurality of operating rods in oppositely threaded engagement with said flanges, a locking element in threaded engagement with one of said operating rods, a pressure element for urging said locking element into locking frictional engagement with said operating rod, and a gear means interconnecting said operating rods for simultaneous rotation.

5. An adjustable diameter pulley comprising a hub, a plurality of flanges mounted thereon, a plurality of operating rods in threaded engagement with said flanges, a locking element mounted in an opening in said flanges with capacity for axial movement relative to said flange and in threaded engagement with one of said operating rods and a releasable locking means mounted on said last mentioned flange for applying pressure to said locking element whereby a general tightening up is effected in regard to all threaded engagements between operating rods and flanges included in said pulley.

6. An adjustable diameter pulley comprising a hub, a plurality of pairs of flanges having oppositely inclined faces mounted on said hub, a plurality of operating rods operatively connected to one of the flanges of each of said pairs of flanges, whereby the rotation of said rods will cause said flanges operatively connected thereto to move in opposite directions, a plurality of connecting rods connecting said flanges which are operatively connected to said operating rods with the others of said flanges, operatively connected gears mounted on said operating rods whereby said operating rods function together in moving said flanges axially on said hub, and a locking means comprising a locking element in threaded engagement with one of said operating rods and a releasable pressure means bearing on said locking element whereby the threads of said locking element and the threads of said operating rod may be locked in frictional engagement.

7. The invention of claim 6 characterized further by the fact that a resilient sleeve is interposed between said hub to which it is bonded and said flanges.

8. An adjustable diameter pulley comprising a metallic hub and metallic flanges surrounding said hub in coaxial relation therewith, said flanges being paired to accommodate a belt between each pair and having inclined faces for causing the belt to move radially with respect to the hub when the flanges of a pair are moved relatively to each other, means for axially moving one flange of each pair relatively to said hub comprising a series of annularly spaced operating rods having threaded engagement with each such flange, said rods being interconnected for simultaneous rotation and a resilient non-metallic sleeve interposed between the hub to which it is bonded and said flange or flanges to which it is keyed whereby metal to metal contact between such parts is completely avoided, and free axial slidable motion of said flanges on said non-metallic sleeve is provided.

9. An adjustable diameter pulley comprising a metallic hub and a series of metallic flanges surrounding said hub in coaxial relation therewith, said flanges being paired to accommodate a belt between each pair and having inclined faces for causing the belt to move radially with respect to the hub when the flanges of a pair are moved relatively to each other, means for axially moving one flange of each pair relatively to said hub comprising a series of annularly spaced operating rods having threaded engagement with each such flange, said rods being interconnected for simultaneous rotation, means for axially moving the other flange of each pair relatively to said hub comprising annularly spaced connecting rods rigidly connecting one flange of each pair with a flange of another pair, and a resilient non-metallic sleeve interposed between the hub to which it is bonded and said flange or flanges to which it is keyed whereby metal to metal contact between such parts is completely avoided, and free axial slidable motion of said flanges on said non-metallic sleeve is provided.

10. An adjustable diameter pulley comprising a metallic hub and metallic flanges surrounding said hub in coaxial relation therewith, said flanges being paired to accommodate a belt between each pair and having inclined faces for causing the belt to move radially with respect to the hub when the flanges of a pair are moved relatively to each other, means for axially moving one flange of said pair relatively to said hub, and a resilient non-metallic sleeve interposed between the hub to which it is bonded and said flange or flanges to which it is keyed whereby metal to metal contact between such parts is completely avoided, and free axial slidable motion of said flanges on said non-metallic sleeve is provided.

11. An adjustable diameter pulley comprising a hub, a plurality of flanges mounted thereon, said flanges being separated from direct contact with said hub by means of an elastic element, a plurality of operating rods in threaded engagement with certain of said flanges and a plurality of connecting rods connecting the other of said flanges to the first mentioned of said flanges, a gear means operatively connecting said operating rods whereby said operating rods operate together to move said flanges on said hub and a locking means mounted on one of said flanges for locking said operating rods against movement, said flange carrying said locking means having a plurality of cylindrical elements integrally mounted in holes formed in said flange and in threaded engagement with certain of said operating rods, and a plurality of cylindrical locking elements similarly mounted in other holes formed in said flange but with capacity for axial movement relative to said flange and in threaded engagement with the other of said operating rods, said locking elements being operatively subject to said locking means.

WILLIAM A. WILLIAMS.

REFERENCES CITED

The following references are of record in the file of this patent:

UNITED STATES PATENTS

| Number | Name | Date |
|---|---|---|
| 1,881,028 | Meyers | Oct. 4, 1932 |
| 2,158,047 | Weston | May 9, 1939 |
| 2,294,951 | Baker | Sept. 8, 1942 |
| 2,433,150 | Palm | Dec. 23, 1947 |